United States Patent [19]
Bertleff

[11] Patent Number: 5,407,083
[45] Date of Patent: Apr. 18, 1995

[54] APPARATUS FOR SORTING AND GUIDING WORKPIECES

[75] Inventor: Wolfgang Bertleff, Lauf A. D. P., Germany

[73] Assignee: Mannesmann Aktiengesellschaft, Dusseldorf, Germany

[21] Appl. No.: 124,819

[22] Filed: Sep. 21, 1993

[30] Foreign Application Priority Data

Sep. 23, 1992 [DE] Germany .................. 42 32 584.6

[51] Int. Cl.⁶ .................. B07C 9/00; B65G 47/10
[52] U.S. Cl. .................. 209/655; 209/911; 198/360
[58] Field of Search .............. 209/246, 655, 911, 941; 193/2 R, 32; 198/531, 532, 535, 536, 550.2, 360

[56] References Cited

U.S. PATENT DOCUMENTS

| | | | |
|---|---|---|---|
| 766,623 | 8/1904 | Huntley | 209/246 X |
| 4,105,544 | 8/1978 | Stevick | 209/246 X |
| 5,228,577 | 7/1993 | Wilson | 209/655 X |
| 5,263,651 | 11/1993 | Nadarajah | 209/655 X |

FOREIGN PATENT DOCUMENTS 10597  5/1980  European Pat. Off. .

*Primary Examiner*—Robert P. Olszewski
*Assistant Examiner*—Tuan N. Nguyen
*Attorney, Agent, or Firm*—Cohen, Pontani, Lieberman, Pavane

[57] ABSTRACT

An apparatus for sorting and essentially vertically guiding workpieces, particularly products of plastics material is arranged between a production machine and at least two subsequently arranged units for producing, conveying or storing. A hopper which can be fastened in a simple manner is arranged in the area in which the workpieces are dropped vertically from the production machine. A frame which is rotatable about a horizontal axis of rotation is mounted at the hopper opening. Webs are fastened to sides of the frame which extend parallel to the axis of rotation. The other ends of the webs are connected to rods arranged spaced from the opening of the hopper. By rotating the frame about its axis of rotation, the webs can be stretched in such a way that an inclined plane is formed along which the workpieces are conveyed in a sliding manner to the subsequently arranged units.

11 Claims, 3 Drawing Sheets

Fig.2
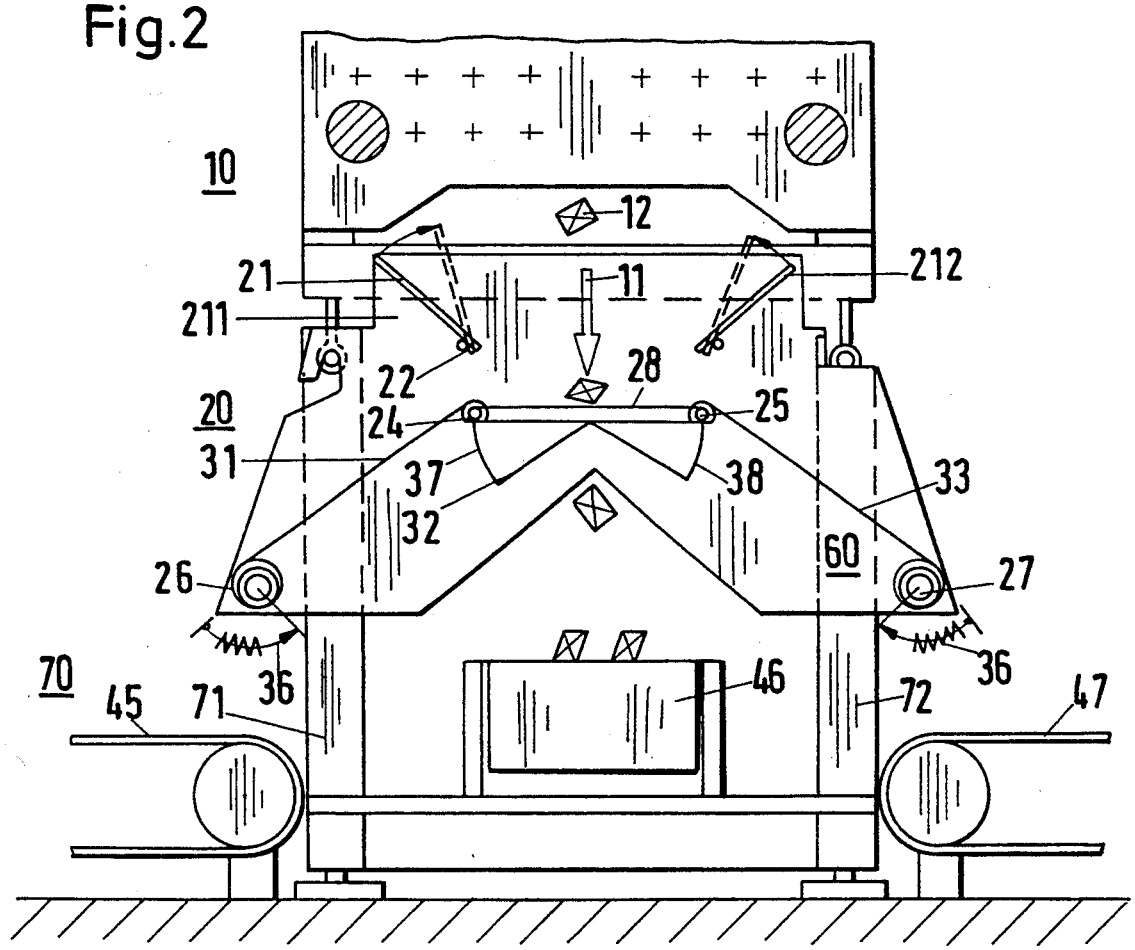
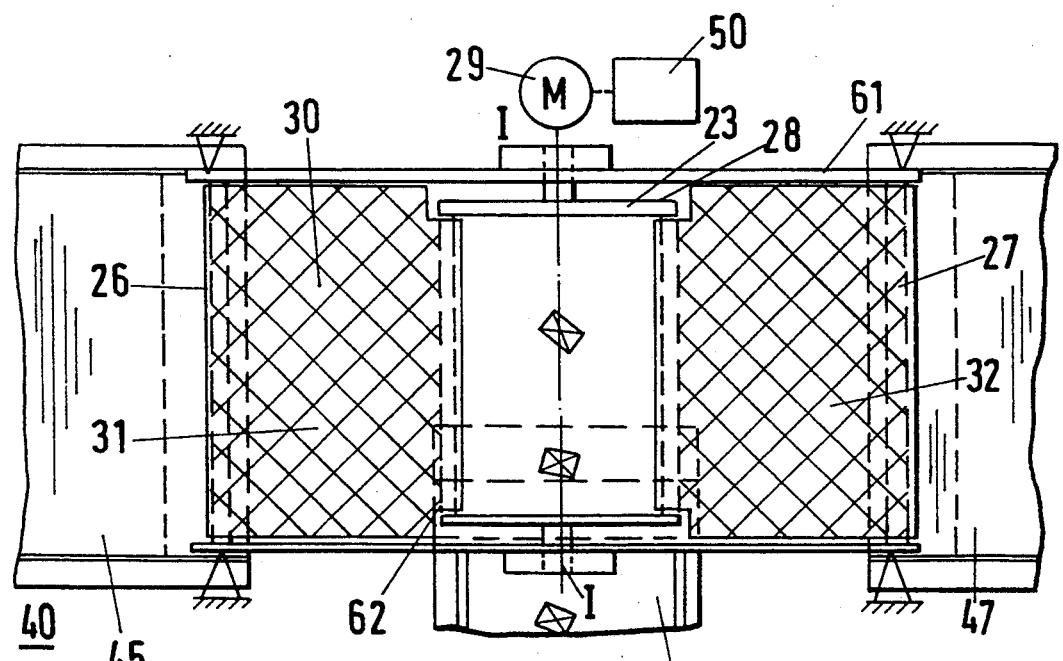
Fig.2a

APPARATUS FOR SORTING AND GUIDING WORKPIECES

BACKGROUND OF THE INVENTION

1. Field of the Invention

The present invention relates to an apparatus for sorting and essentially vertically guiding workpieces, particularly products of plastics material arranged between a production machine and at least two subsequently arranged means for producing, conveying or storing.

2. Description of the Related Art

Sorting switches are known for separating and sorting workpieces which leave a production machine in a vertical direction. This type of sorting apparatus usually has fixed walls, frequently of metallic materials. Thus, workpieces dropping into this apparatus not only produce significant noise, but the hard impact on the fixed walls may lead to damage to the workpieces.

EP-PS 0 010 597 discloses a feed channel for axially conveying rod-shaped material. The feed channel has webs which are distributed over the length of the channel and are attached on both ends to channel section segments arranged on both sides of the vertical center of the channel cross-section. It is known from EP-PS 0 010 597 to use textile webs which deflect the individually arriving workpieces without significant impact.

However, the known feed channel is suitable only for the axial conveyance of rod-shaped material and does not have elements for sorting the workpieces.

SUMMARY OF THE INVENTION

Therefore, it is the primary object of the present invention to provide an apparatus of the above-described type which is capable of sorting workpieces with simple means in a space saving manner and with reduced noise and of gently feeding the workpieces to at least two subsequently arranged production units, storage units or conveying units.

In accordance with the present invention, a hopper which can be fastened in a simple manner, is arranged in the area in which the workpieces are vertically dropped out of a production machine. A frame which can be rotated about its central axis is arranged at the outlet opening of the hopper. The rotatable frame has sides which extend parallel to the axis of rotation of the frame. Webs are attached to the sides, wherein the other ends of the webs facing away from the rotatable frame are arranged on rods. By rotating the frame about its central axis, the webs can be tensioned in such a way that an inclined plane is produced along which the workpieces are conveyed slidingly to subsequently arranged means, such as, production units, storage units or conveying units.

The drive of the frame is connected to a measuring and regulating unit which moves the frame in dependence on predeterminable measuring results or in accordance with a randomizer. The frame can be moved between at least two positions, wherein in each position at least one of the sides of the frame is located closely adjacent an edge of the outlet opening of the hopper extending parallel to the axis of rotation of the frame and the other side of the frame is located spaced from the opposite edge of the outlet opening of the hopper in order to permit workpieces to be passed therebetween.

The angle of rotation between the two described positions is 270° to 340°.

In addition, the frame can assume a third position and, thus, provide another sorting criteria. When only two webs are used, the frame is moved into the horizontal position, so that the hopper opening is completely open and the workpieces drop vertically through the frame.

If a third web is used, this web is arranged in such a way that it covers the frame and forms a channel. In this advantageous further development, the workpieces drop onto the channel-like web, and the impact of the workpieces is dampened in a noise-reducing manner and the workpieces subsequently slide in accordance with the angle of the channel apex into the subsequently arranged units.

The apparatus according to the present invention can also be easily mounted on already existing machines because it can be attached in a simple manner to the production machines. This can be effected by means of simple threaded bores, so that, for example, welding is unnecessary as a type of fastening. Another type of fastening is fixing by means of magnetic feet at the machine discharge chute.

Moreover, the proposed sorting shift requires little structural space, so that a large free space remains in the area of the production machine for conveyor belts, transport containers or the like. The conveying and sorting apparatus has a low weight and is structurally simple, so that it can be moved with few manipulations into the workpiece discharge area of the production machine and, thus, can be adapted in an optimum manner to the conveying requirements. The secure conveyance and sorting of workpieces by the proposed apparatus makes it possible to handle the pieces dropping from the production machine in a manner appropriate for the workpieces. By using flexible, damping foil or fabric webs as impact and sliding surfaces, the workpieces dropping from the production machine are treated in an extremely gentle manner.

Teflon fabric or teflon and glass fabric are proposed as materials for the fabric webs. When teflon fabric webs or teflon and glass fabric webs are used as impact and sliding surface, in addition to good sliding properties and high mechanical load-bearing capability resistance to tearing, the fabric web surfaces have high temperature resistance, particularly due to the glass fabric insert. The workpieces leaving the opened tool may have temperatures of up to 300° C. Even at these high temperatures, teflon fabrics have a particularly long service life and are additionally suitable to make it possible, after the plastic material has cooled, to easily remove from the teflon fabric any plastics material which may have caked onto the teflon fabric. Webs having a thickness of approximately 0.25 mm may be used. These webs have a high flexibility and long service life and require little maintenance.

When spring shafts are used at the fixed points for tensioning the fabric webs, a change of the spring tension of the spring shaft makes possible an impact damping of the workpieces which is variable in a wide range. The initial tension of the spring shaft can be limited in such a way that any errors due to an inexact adjustment or an overrunning of the drive has no damaging effect on the fabric webs, the mechanical structure and the drive. It is possible with simple means to refit, as required, a two-position separating switch into a three-position separating switch.

The sorting criteria which may be applied are not only "good pieces" and "bad pieces", but also "test pieces", wherein the test pieces may be guided to means, for example, into containers or onto conveyor belts.

Another proposed feature provides to use endless fabric webs. When the fabric web is contaminated or worn, it can be pulled further over rollers arranged on the sides or rods.

In accordance with another feature, baffle plates which can be pivoted toward the pouring direction are provided at the opening of the hopper. This makes it possible to adapt and use an identical apparatus in connection with several machines having different dimensions in the area of the discharge chute by changing the adjustment of the pivotable baffle plates.

The drive may be an electro-motor operating through a worm gear unit. As compared to pneumatic rotary drives or linear drives with subsequent conversion into rotary movement, the worm gear drive is not only advantageous with respect to cost, the substantial self-locking action in the end positions thereof through the worm gear unit additionally ensures a low energy requirement and an operation which is low in noise.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawing:

FIG. 2 shows the apparatus according to the present invention with three webs and in the main sorting position.

DETAILED DESCRIPTION OF THE PREFERRED EMBODIMENTS

Figure 1:
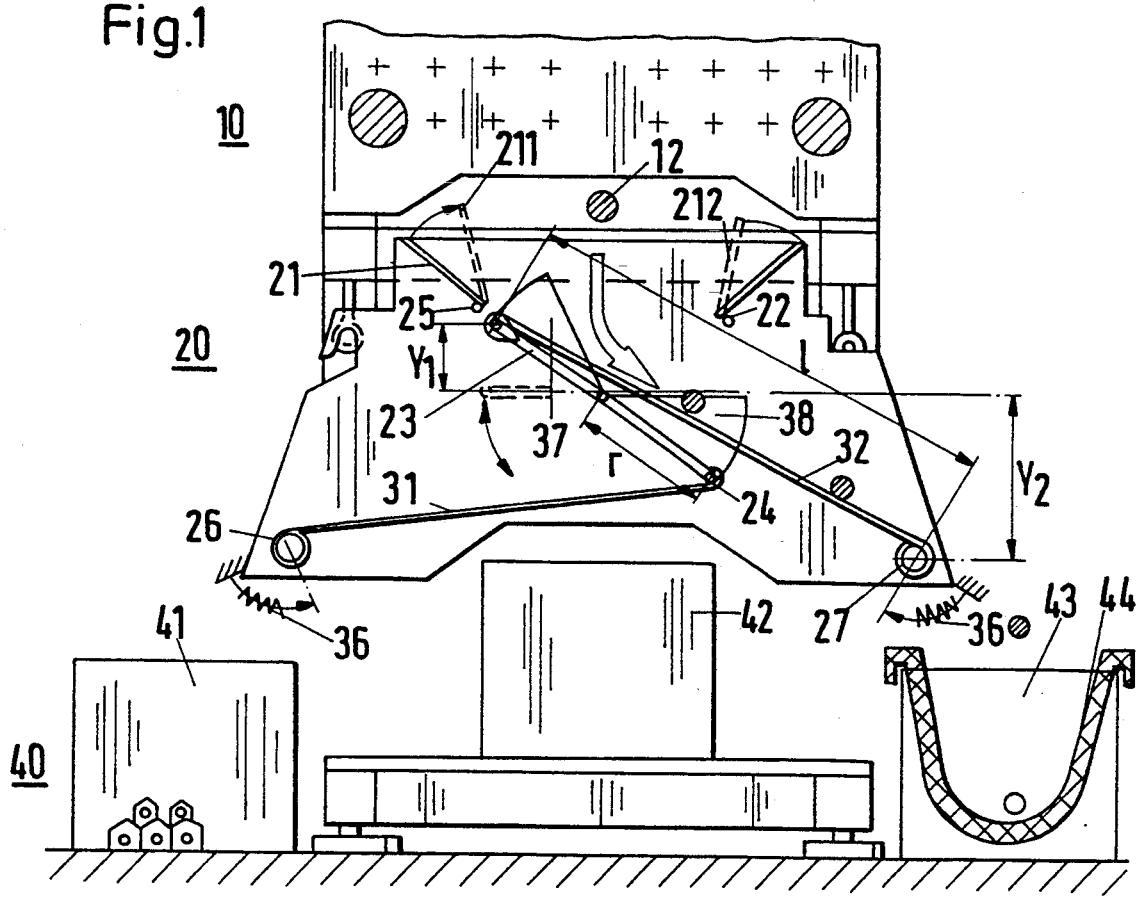
FIG. 1 shows the apparatus according to the present invention with three containers in a first sorting position.
Figure 1A:
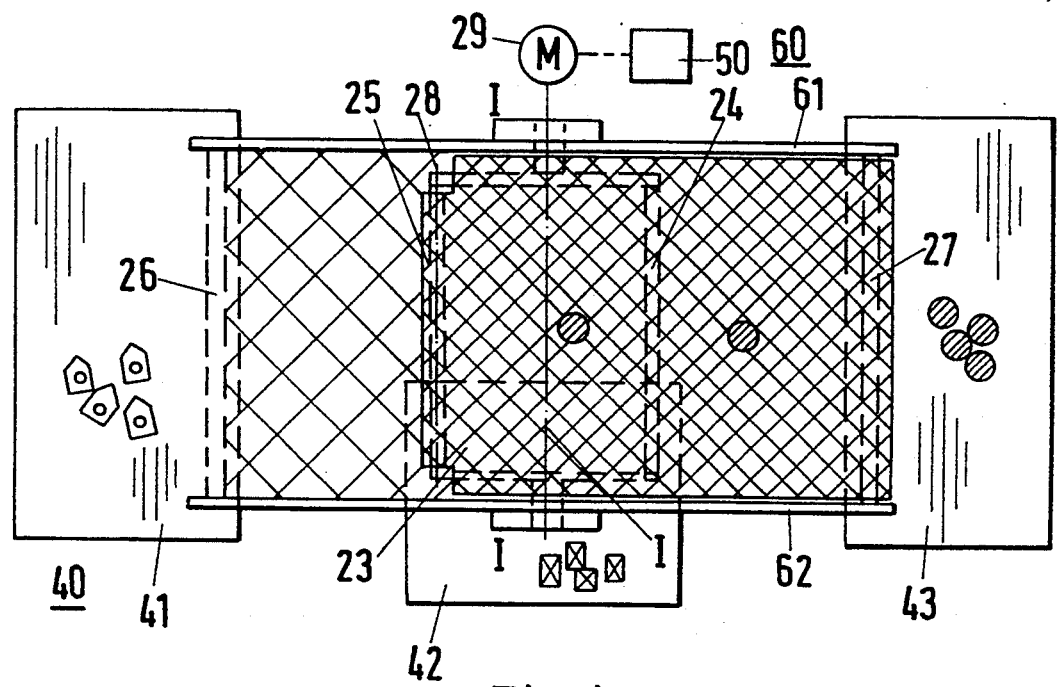

FIGS. 1 and 2 of the drawing show a portion of a production machine 10 with a workpiece discharge 11.

A supporting and guiding apparatus 20 is releasably fastened on the production machine 10 in a dropping direction of the workpieces 12. The apparatus 20 includes a hopper 21 which is provided with pivotable baffle plates 211 and 212. A rotatable frame 23 is mounted at the opening 22 of the hopper 21. The frame 23 has two sides 24 and 25 which extend parallel to the axis of rotation I of the frame and are connected to a drive 29 through connecting elements 28. The connecting elements 28 may be rod-shaped or may be composed of sheet-like circle segments, wherein the circle segments 37 and 38 cover the respective open position of the rotatable frame on the sides thereof.

Rods 26 and 27 are arranged in the conveying direction of the workpieces 12 underneath the hopper opening 22 and outside the hopper opening 22. Webs 31 and 32 are provided between the sides 24, 25 and the rods 26, 27. The webs 31 and 32 have a length l which is between 2.3 and 2.7 times the size of the radius r of the rotatable frame 23. The ratio of the vertical distance of the sides or rods to the axis of rotation I is $Y_1:Y_2 = 0.4$ to 0.8. This makes it possible to obtain an optimum pouring angle for conveying the workpieces by suitably stretching the webs. In the sorting position shown in FIG. 1, the webs are stretched to such an extent that, when the angular position is adjusted that one of the sides 24 or 25 is located near the hopper opening 22, the respectively opposite side 25 or 24 is not touched even when workpieces 12 drop onto the web.

The webs 31, 32 may also be stretched in an adjustable manner through tensioning elements 36. In the drawing, these tensioning elements 36 are shown in the form of spring shafts mounted on the rods 26, 27.

The workpieces 12 are conveyed to means 40 which, as shown in FIG. 1, are constructed as containers 41 to 43. In order to further reduce noise, an additional sound dampening means 44, in the form of a web, is provided in the container 43.

The drive 29 of the rotatable frame 23 is connected for its control to a measuring and control device 50, not described in detail.

In FIG. 1, the support of the movable frame 23 and of the rods 26 and 27 is shown in the form of lateral jaws 61 and 62 of a support 60 which is fastened directly to the hopper 21. On the other hand, the sorting apparatus 20 can also be constructed as a stationary apparatus, wherein the hopper 21 is arranged independently thereof on the production machine. This would make it easily possible to achieve a different placement, for example, a rotation by 90°.

FIG. 1 shows the situation in which the workpieces 12 are deflected through the web 32 into the container 43. The container 43 could be used, for example, for receiving "bad parts", while the container 41 could receive the "test parts" and the container 42 could receive the "good parts".

FIG. 2 shows the rotatable frame 23 in the horizontal position, so that the workpieces 12 can drop directly onto a conveyor belt 46 instead of into the container 42 shown in FIG. 1. In contrast to FIG. 1, FIG. 2 shows two additional conveyor belts 45, 47 as examples of conveying means for conveying away the workpieces.

FIG. 2 further shows the support of the frame 23 and of the rods 26 and 27 which is structurally possible in the form of a frame 70 which can be placed onto the ground with the sides 71 and 72. In addition, the connecting elements 28 to the sides 24 and 25 are constructed in the form of water-circle disks 37, 38.

Figure 3:
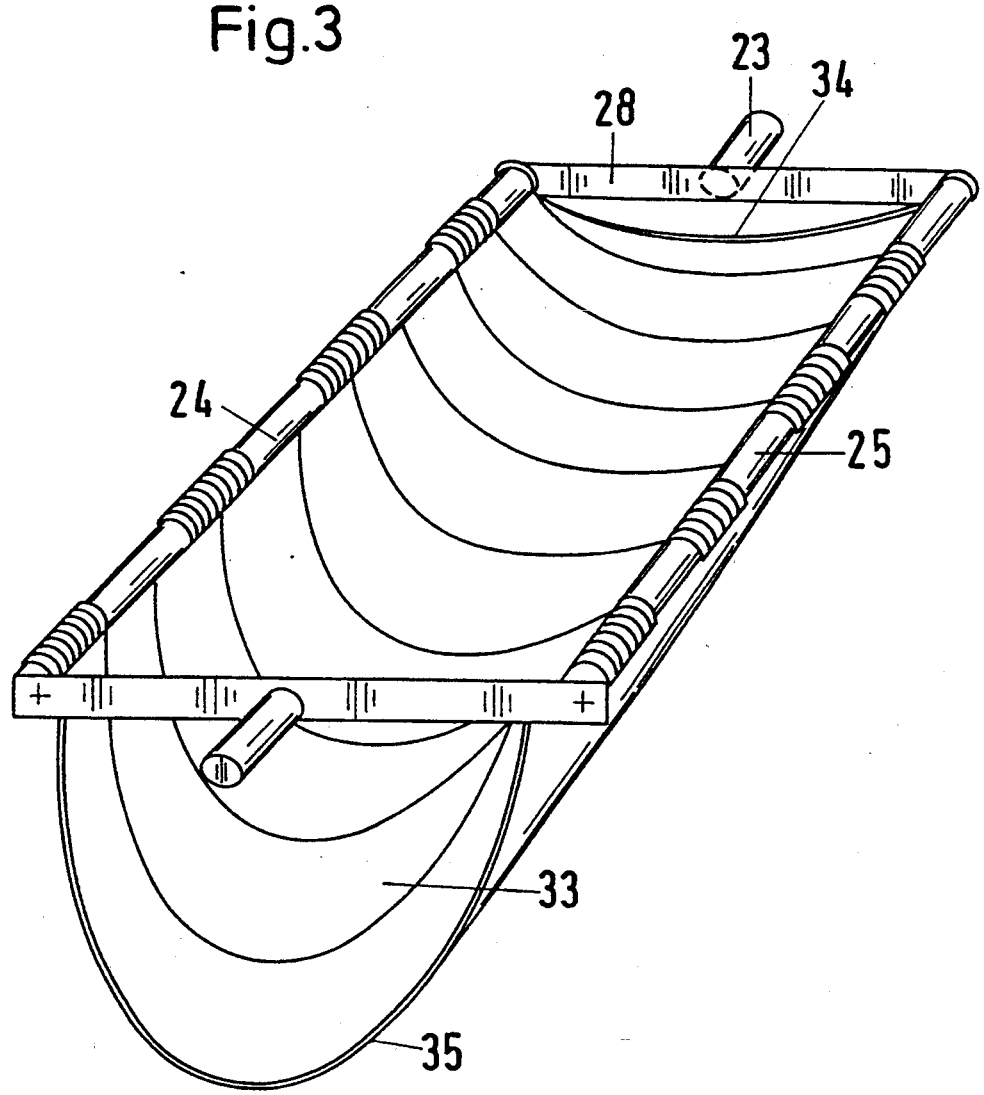
FIG. 3 is a perspective view of a feeding web.

FIG. 3 of the drawing shows a rotatable frame 23 to which is attached a web 33 in addition to the webs 31 and 32 shown in FIGS. 1 and 2. The web 33 is constructed in the form of a chute and has a short edge 34 and a long edge 35, as can be seen in the perspective view of FIG. 3. The web 33 is wound around the sides 24, 25 on the over portions thereof, so that the webs 31 and 32 can also be fastened to the webs 24, 25.

The invention is not limited by the embodiments described above which are presented as examples only but can be modified in various ways within the scope of protection defined by the appended patent claims.

I claim:

1. A sorting and guiding apparatus for sorting and essentially vertically guiding workpieces, the sorting and guiding apparatus being mounted between a production machine and at least two subsequently arranged means for producing, conveying, or storing, the sorting and guiding apparatus comprising a hopper connected to a workpiece discharge of the production machine, the hopper having an opening with edges; a rotatable frame mounted at the opening of the hopper, the frame being rotatable about a horizontally extending axis of rotation, the axis of rotation being in horizontal alignment with the opening of the hopper, the frame having sides extending parallel to the axis of rotation; webs having first ends connected to the frame sides; and rods mounted spaced vertically and horizontally outwardly from the opening of the hopper and extending parallel to the sides of the rotatable frame, the webs having second ends attached to the rods, the frame being rotatable into two positions of operation, wherein, in each position of operation, one of the sides of the frame is located adjacent one of the edges of the opening of the hopper and the webs are stretched within a range of rotation of the frame of ±5° between the side of the frame adjacent the edge of the opening of the hopper and the rod located opposite from the side of the frame located adjacent the edge of the opening of the hopper, such that the web extends underneath the opening of the hopper.

2. The apparatus according to claim 1, wherein the webs have a length and the frame has a radius, wherein the ratio of the length of the webs to the radius of the frame is 2.3 to 2.7, in the position of operation, the side adjacent the edge of the opening of the hopper is vertically spaced from the axis of rotation of the frame by a first distance and the rod opposite from the side adjacent to the edge of the opening of the hopper is vertically spaced by a second distance from the axis of rotation of the frame, and wherein the ratio of the first distance to the second distance is 0.4 to 0.8.

3. The apparatus according to claim 2, wherein the webs are of tear-resistant, flexible plastics material.

4. The apparatus according to claim 3, wherein the webs are of teflon fabric or teflon glass fabric.

5. The apparatus according to claim 3, wherein the webs are endless fabric webs extending around the sides and the rods.

6. The apparatus according to claim 1, wherein at least one of the sides and the rods comprise tensioning elements for stretching the webs.

7. The apparatus according to claim 6, wherein the tensioning elements are spring shafts.

8. The apparatus according to claim 1, further comprising another web extending between the sides of the rotatable frame, the another web forming a chute having free edges, wherein the free edges have different lengths.

9. The apparatus according to claim 1, comprising a drive for the rotatable frame, and a measuring and control device for the production machine operatively connected with the drive.

10. The apparatus according to claim 9, wherein the drive is an electric motor with a worm gear drive.

11. The apparatus according to claim 1, wherein the hopper comprises at the opening thereof baffle plates, the baffle plates being pivotal in discharge direction of the production machine.

* * * * *